United States Patent
Olszewski et al.

[11] Patent Number: 6,041,621
[45] Date of Patent: Mar. 28, 2000

[54] SINGLE CIRCUIT CRYOGENIC LIQUEFACTION OF INDUSTRIAL GAS

[75] Inventors: Walter Joseph Olszewski, Amherst; Bayram Arman, Grand Island; Joseph Alfred Weber, Cheektowaga; Arun Acharya, East Amherst, all of N.Y.

[73] Assignee: Praxair Technology, Inc., Danbury, Conn.

[21] Appl. No.: 09/222,813

[22] Filed: Dec. 30, 1998

[51] Int. Cl.⁷ .................................................. F25I 1/00
[52] U.S. Cl. .................................................. 62/613; 62/619
[58] Field of Search .............................. 62/612, 613, 619

[56] References Cited

U.S. PATENT DOCUMENTS

| | | | |
|---|---|---|---|
| 3,733,845 | 5/1973 | Lieberman | 62/335 |
| 3,932,154 | 1/1976 | Coers et al. | 62/9 |
| 3,970,441 | 7/1976 | Etzbach et al. | 62/612 |
| 3,992,167 | 11/1976 | Beddome | 62/18 |
| 5,157,925 | 10/1992 | Denton et al. | 62/11 |
| 5,441,658 | 8/1995 | Boyarsky et al. | 252/67 |
| 5,502,972 | 4/1996 | Howard et al. | 62/23 |
| 5,579,654 | 12/1996 | Longsworth et al. | 62/511 |

*Primary Examiner*—Ronald Capossela
*Attorney, Agent, or Firm*—Stanley Ktorides

[57] ABSTRACT

A method for more efficiently liquefying industrial gas wherein refrigeration for the liquefaction is generated using a defined multicomponent refrigerant fluid and provided by a single flow circuit over a wide temperature range from ambient to cryogenic temperature.

11 Claims, 1 Drawing Sheet

— 6,041,621 —

SINGLE CIRCUIT CRYOGENIC LIQUEFACTION OF INDUSTRIAL GAS

TECHNICAL FIELD

This invention relates generally to the liquefaction of industrial gas wherein the gas is brought from ambient temperature to a cryogenic temperature to effect the liquefaction.

BACKGROUND ART

Liquefaction of industrial gases is an important step which is used in the processing of almost all industrial gas separation and purification operations. Typically the industrial gas is liquefied by indirect heat exchange with a refrigerant. Such a system, while working well for providing refrigeration over a relatively small temperature range from ambient, is not as efficient when refrigeration over a large temperature range, such as from ambient to a cryogenic temperature, is required. One way this inefficiency has been addressed is to use a liquefaction process with multiple flow circuits wherein each circuit serves to reduce the temperature of the industrial gas over a portion of the range until the requisite cryogenic condensing temperature is reached. However, such multiple circuit industrial gas liquefiers may be complicated to operate.

Accordingly, it is an object of this invention to provide a single circuit liquefaction arrangement whereby industrial gas may be brought from ambient temperature to a cryogenic liquefaction temperature which operates with greater efficiency than heretofore available single circuit systems.

SUMMARY OF THE INVENTION

The above and other objects, which will become apparent to one skilled in the art upon a reading of this disclosure, are attained by the present invention, which is:

A method for liquefying an industrial gas comprising:

(A) compressing a multicomponent refrigerant fluid comprising at least one component from the group consisting of fluorocarbons, hydrofluorocarbons and fluoroethers and at least one component from the group consisting of fluorocarbons, hydrofluorocarbons, fluoroethers and atmospheric gases;

(B) cooling the compressed multicomponent refrigerant fluid to at least partially condense the multicomponent refrigerant fluid;

(C) expanding the cooled compressed multicomponent refrigerant fluid to generate refrigeration;

(D) warming the expanded multicomponent refrigerant fluid by indirect heat exchange with the compressed multicomponent refrigerant fluid to effect said cooling of the compressed multicomponent refrigerant fluid; and (E) bringing the expanded multicomponent refrigerant fluid into heat exchange relation with industrial gas and warming the expanded multicomponent refrigerant fluid by indirect heat exchange with said industrial gas to liquefy the industrial gas.

As used herein the term "non-toxic" means not posing an acute or chronic hazard when handled in accordance with acceptable exposure limits.

As used herein the term "non-flammable" means either having no flash point or a very high flash point of at least 600° K.

As used herein the term "non-ozone-depleting" means having zero-ozone depleting potential, i.e. having no chlorine or bromine atoms.

As used herein the term "normal boiling point" means the boiling temperature at 1 standard atmosphere pressure, i.e. 14.696 pounds per square inch absolute.

As used herein the term "indirect heat exchange" means the bringing of fluids into heat exchange relation without any physical contact or intermixing of the fluids with each other.

As used herein the term "expansion" means to effect a reduction in pressure.

As used herein the terms "turboexpansion" and "turboexpander" means respectively method and apparatus for the flow of high pressure fluid through a turbine to reduce the pressure and the temperature of the fluid thereby generating refrigeration.

As used herein the term "variable load refrigerant" means a mixture of two or more components in proportions such that the liquid phase of those components undergoes a continuous and increasing temperature change between the bubble point and the dew point of the mixture. The bubble point of the mixture is the temperature, at a given pressure, wherein the mixture is all in the liquid phase but addition of heat will initiate formation of a vapor phase in equilibrium with the liquid phase. The dew point of the mixture is the temperature, at a given pressure, wherein the mixture is all in the vapor phase but extraction of heat will initiate formation of a liquid phase in equilibrium with the vapor phase. Hence, the temperature region between the bubble point and the dew point of the mixture is the region wherein both liquid and vapor phases coexist in equilibrium. In the practice of this invention the temperature differences between the bubble point and the dew point for the variable load refrigerant is at least 10° K., preferably at least 20° K. and most preferably at least 50° K.

As used herein the term "fluorocarbon" means one of the following: tetrafluoromethane ($CF_4$), perfluoroethane ($C_2F_6$), perfluoropropane ($C_3F_8$), perfluorobutane ($C_4F_{10}$), perfluoropentane ($C_5F_{12}$), perfluoroethene ($C_2F_4$), perfluoropropene ($C_3F_6$), perfluorobutene ($C_4F_8$), perfluoropentene ($C_5F_{10}$), hexafluorocyclopropane (cyclo-$C_3F_6$) and octafluorocyclobutane (cyclo-$C_4F_8$).

As used herein the term "hydrofluorocarbon" means one of the following: fluoroform ($CHF_3$), pentafluoroethane ($C_2HF_5$), tetrafluoroethane ($C_2H_2F_4$), heptafluoropropane ($C_3HF_7$), hexafluoropropane ($C_3H_2F_6$), pentafluoropropane ($C_3H_3F_5$), tetrafluoropropane ($C_3H_4F_4$), nonafluorobutane ($C_4HF_9$), octafluorobutane ($C_4H_2F_8$), undecafluoropentane ($C_4HF_9$), methyl fluoride ($CH_3F$), difluoromethane ($CH_2F_2$), ethyl fluoride ($C_2H_5F$), difluoroethane ($C_2H_4F_2$), trifluoroethane ($C_2H_3F_3$), difluoroethene ($C_2H_2F_2$), trifluoroethene ($C_2HF_3$), fluoroethene ($C_2H_3F$), pentafluoropropene ($C_3HF_5$), tetrafluoropropene ($C_3H_2F_4$), trifluoropropene ($C_3H_3F_3$), difluoropropene ($C_3H_4F_2$), heptafluorobutene ($C_4HF_7$), hexafluorobutene ($C_4H_2F_6$) and nonafluoropentene ($C_5HF_9$).

As used herein the term "fluoroether" means one of the following: trifluoromethyoxy-perfluoromethane ($CF_3$—O—$CF_3$), difluoromethoxy-perfluoromethane ($CHF_2$—O—$CF_3$), fluoromethoxy-perfluoromethane ($CH_2F$—O—$CF_3$), difluoromethoxy-difluoromethane ($CHF_2$—O—$CHF_2$), difluoromethoxy-perfluoroethane ($CHF_2$—O—$C_2F_5$), difluoromethoxy-1,2,2,2-tetrafluoroethane ($CHF_2$—O—$C_2HF_4$), difluoromethoxy-1,1,2,2-tetrafluoroethane ($CHF_2$—O—$C_2HF_4$), perfluoroethoxy-fluoromethane ($C_2F_5$—O—$CH_2F$), perfluoromethoxy-1,1,2-trifluoroethane ($CF_3$—O—$C_2H_2F_3$), perfluoromethoxy-1,2,2-trifluoroethane ($CF_3O$—$C_2H_2F_3$), cyclo-1,1,2,2-tetrafluoropropylether (cyclo-$C_3H_2F_4$—O—), cyclo-,1,1,3, 3-tetrafluoropropylether (cyclo-$C_3H_2F_4$—O—), perfluoromethoxy-,1,1,2,2-tetrafluoroethane ($CF_3$—O—$C_2HF_4$), cyclo-1,1,2,3,3-pentafluoropropylether (cyclo-$C_3H_5$—O—), perfluoromethoxy-perfluoroacetone ($CF_3$—O—$CF_2$—O—$CF_3$), perfluoromethoxy-perfluoroethane ($CF_3$—O—$C_2F_5$), perfluoromethoxy-1,2,2,2-tetrafluoroethane ($CF_3$—O—$C_2HF_4$), perfluoromethoxy-2,2,2-trifluoroethane ($CF_3$—O—$C_2H_2F_3$), cyclo-perfluoromethoxy-perfluoroacetone (cyclo-$CF_2$—O—$CF_2$—O—$CF_2$—) and cyclo-perfluoropropylether (cyclo-$C_3F_6$—O).

As used herein the term "atmospheric gas" means one of the following: nitrogen ($N_2$), argon (Ar), krypton (Kr), xenon (Xe), neon (Ne), carbon dioxide ($CO_2$), oxygen ($O_2$) and helium (He).

As used herein the term "low-ozone-depleting" means having an ozone depleting potential less than 0.15 as defined by the Montreal Protocol convention wherein dichlorofluoromethane ($CCl_2F_2$) has an ozone depleting potential of 1.0.

As used herein the term "industrial gas" means nitrogen, oxygen, hydrogen, helium, carbon dioxide, argon, methane, carbon monoxide, as well as fluid mixtures containing two or more thereof.

As used herein the term "cryogenic temperature" means a temperature of 150° K. or less.

As used herein the term "refrigeration" means the capability to reject heat from a subambient temperature system to the surrounding atmosphere.

DETAILED DESCRIPTION

The invention comprises, in general, the use of a defined mixed refrigerant to efficiently provide refrigeration over a very large temperature range, such as from ambient temperature to a cryogenic temperature. Such refrigeration can be effectively employed for the liquefaction of industrial gases, which calls for such a wide temperature range, without the need for employing complicated multiple refrigeration circuits. The single loop system of the invention involves a single compression train, involving single-stage or multi-stage compressors, which process the entire multicomponent refrigerant mixture as a single mixture which is subsequently expanded through a J/T valve or liquid turbine to produce refrigeration.

Figure 1:
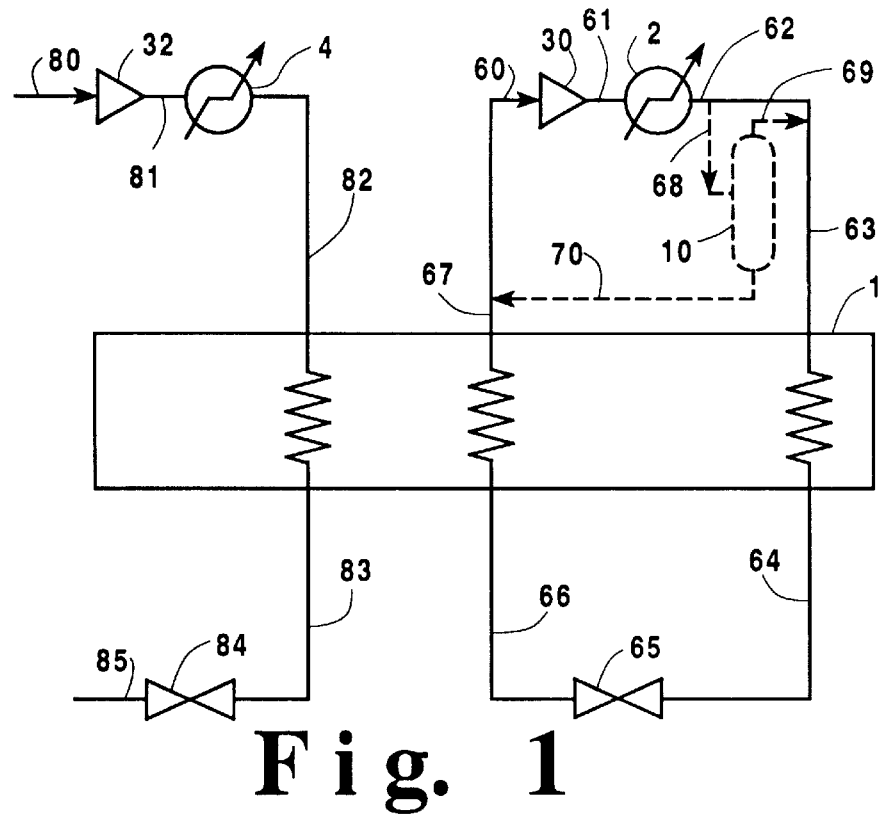
FIG. 1 is a schematic flow diagram of one preferred embodiment of the single circuit industrial gas liquefaction system of this invention.

The invention will be described in greater detail with reference to the Drawings. Referring now to FIG. 1, multicomponent refrigerant fluid 60 is compressed by passage through compressor 30 to a pressure generally within the range of from 100 to 800 pounds per square inch absolute (psia). The compressor may have a single stage or may have multiple stages. Preferably the compression ratio, i.e. the ratio of the pressure of compressed multicomponent refrigerant fluid 61 to fluid 60 is within the range of from 2 to 15 and most preferably exceeds 5. In a particularly preferred embodiment compressor 30 comprises three compression stages with a compression ratio of from 2.5 to 3.0 for each stage. In the event compressor 30 is an oil lubricated compressor the discharge from the compressor may be passed, as shown by dotted line 68, to separator 10 wherein any oil in the discharge is separated and recycled to the compressor via line 70, and cleaned refrigerant fluid is passed back into the refrigerant circuit via line 69.

Compressed multicomponent refrigerant fluid in line 62 is cooled of the heat of compression in aftercooler 2 wherein it is preferably partially condensed, and resulting multicomponent refrigerant fluid 63 is passed through heat exchanger 1 wherein it is further cooled and preferably completely condensed. Resulting multicomponent refrigerant liquid 64 is throttled through valve 65 wherein it is expanded to a pressure generally within the range of from 15 to 100 psia thus generating refrigeration. The pressure expansion of the fluid through valve 65 provides refrigeration by the Joule-Thomson effect, i.e. lowering of the fluid temperature due to pressure reduction at constant enthalpy. Typically the temperature of expanded multicomponent refrigerant fluid 66 will be within the range of from 70 to 200° K., preferably within the range of from 80 to 120° K. The expansion of the multicomponent refrigerant fluid through valve 65 also causes a portion of the fluid to vaporize.

Refrigeration bearing multicomponent two phase refrigerant fluid in stream 66 is then passed through heat exchanger 1 wherein it is warmed and completely vaporized thus serving by indirect heat exchange to cool the compressed multicomponent refrigerant fluid 63. The warming of fluid 66 also serves to liquefy industrial gas as will be more fully described below. The resulting warmed multicomponent refrigerant fluid in vapor stream 67, which is generally at a temperature within the range of from 260 to 330° K., is recycled to compressor 30 and the refrigeration cycle starts anew.

Industrial gas, e.g. nitrogen, in stream 80 is compressed by passage through compressor 32 to a pressure generally within the range of from 30 to 800 psia, and resulting industrial gas stream 81 is cooled of the heat of compression by passage through aftercooler 4. Compressed industrial gas stream 82 is then passed through heat exchanger 1 wherein it is cooled and condensed, and preferably subcooled, by indirect heat exchange with the aforesaid warming refrigeration bearing multicomponent refrigerant fluid. Resulting liquefied industrial gas in stream 83 is then passed through valve 84 and as stream 85 passed on to a use point and/or to a storage tank.

It should be noted that although the invention is described for liquefying ambient temperature industrial gases, the invention may also be employed to liquefy precooled industrial gases. For some circumstances the industrial gas can be precooled by another refrigeration process and then provided to the multicomponent refrigeration system of this invention for further cooling and liquefaction.

In the practice of this invention the multicomponent refrigerant fluid provides the required refrigeration to liquefy the industrial gas to the desired level very efficiently, resulting in bringing the cooling and heating curves close together and as parallel to each other as possible so as to reduce the irreversibilities of the liquefaction operation to a practical minimum. The condensing multicomponent refrigerant fluid is constantly changing its composition and thus its condensing temperature making it possible to improve the efficiency of the industrial gas liquefaction. The improvement is derived from the use of the defined multiple components in the refrigerant fluid, each with its own normal boiling point and associated latent heat of vaporization. The proper selection of the refrigerant components, optimum concentrations in the mixture, along with operating pressure levels, and refrigerant cycles, allows the generation of variable amounts of refrigeration over the required temperature range. The provision of the variable refrigeration as a function of the temperature allows the optimum control of heat exchange temperature differences within the liquefaction system and thereby reduces system energy requirements.

Figure 2:
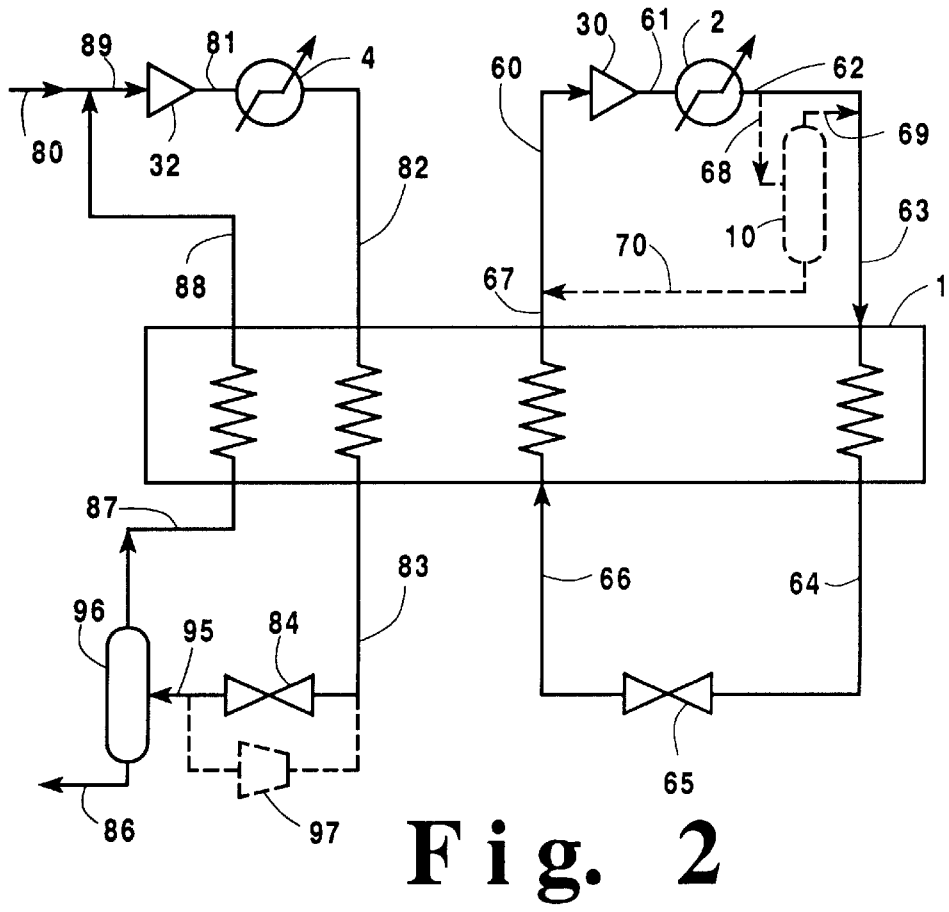
FIG. 2 is a schematic flow diagram of another preferred embodiment of the single circuit industrial gas liquefaction system of this invention.

FIG. 2 illustrates another preferred embodiment of the industrial gas liquefaction method of the invention. The numerals in FIG. 2 are the same as those in FIG. 1 for the common elements, and these common elements will not be described again in detail.

Referring now to FIG. 2, the passage of liquefied industrial gas 83 through valve 84 causes a portion of the industrial gas to vaporize. Resulting two phase stream 95 is then passed into phase separator 96 wherein the industrial gas is separated into liquid, which is passed out from separator 96 in stream 86 to a use point and/or to storage, and into vapor, which is passed out from phase separator 96 in stream 87 to heat exchanger 1. Alternatively, as shown by the dotted lines, liquefied industrial gas 83 could be turboexpanded through turboexpander 97 to generate two phase stream 95 along with additional refrigeration. Industrial gas vapor in stream 87 is passed through heat exchanger 1 wherein it is warmed by indirect heat exchange with condensing industrial gas 82, thus further enhancing the liquefaction. Resulting warmed industrial gas vapor 88 is combined with stream 80 to form stream 89 which is then passed to compressor 32.

The multicomponent refrigerant fluid useful in the practice of this invention contains at least one component from the group consisting of fluorocarbons, hydrofluorocarbons, and fluoroethers and at least one component from the group consisting of fluorocarbons, hydrofluorocarbons, fluoroethers and atmospheric gases in order to provide the required refrigeration at each temperature. The choice of refrigerant components will depend on the refrigeration load versus temperature for the particular process application. Suitable components will be chosen depending upon their normal boiling points, latent heat, and flammability, toxicity, and ozone-depletion potential.

One preferable embodiment of the multicomponent refrigerant fluid useful in the practice of this invention comprises at least two components from the group consisting of fluorocarbons, hydrofluorocarbons and fluoroethers and at least one atmospheric gas.

Another preferable embodiment of the multicomponent refrigerant fluid useful in the practice of this invention comprises at least two components from the group consisting of fluorocarbons, hydrofluorocarbons and fluoroethers, and at least two atmospheric gases.

Another preferable embodiment of the multicomponent refrigerant fluid useful in the practice of this invention comprises at least one fluoroether and at least one component from the group consisting of fluorocarbons, hydrofluorocarbons, fluoroethers and atmospheric gases.

In one preferred embodiment the multicomponent refrigerant fluid consists solely of fluorocarbons. In another preferred embodiment the multicomponent refrigerant fluid consists solely of fluorocarbons and hydrofluorocarbons. In another preferred embodiment the multicomponent refrigerant fluid consists solely of fluorocarbons and atmospheric gases. In another preferred embodiment the multicomponent refrigerant fluid consists solely of fluorocarbons, hydrofluorocarbons and fluoroethers. In another preferred embodiment the multicomponent refrigerant fluid consists solely of fluorocarbons, fluoroethers and atmospheric gases.

Although the multicomponent refrigerant fluid useful in the practice of this invention may contain other components such as hydrochlorofluorocarbons and/or hydrocarbons, preferably the multicomponent refrigerant fluid contains no hydrochlorofluorocarbons. In another preferred embodiment of the invention the multicomponent refrigerant fluid contains no hydrocarbons, and most preferably the multicomponent refrigerant fluid contains neither hydrochlorofluorocarbons nor hydrocarbons. Most preferably the multicomponent refrigerant fluid is non-toxic, non-flammable and non-ozone-depleting and most preferably every component of the multicomponent refrigerant fluid is either a fluorocarbon, hydrofluorocarbon, fluoroether or atmospheric gas.

The invention is particularly advantageous for use in efficiently reaching cryogenic temperatures from ambient temperatures. Tables 1–5 list preferred examples of multicomponent refrigerant fluid mixtures useful in the practice of this invention. The concentration ranges given in Tables 1–5 are in mole percent.

TABLE 1

| COMPONENT | CONCENTRATION RANGE |
| --- | --- |
| $C_5F_{12}$ | 5–25 |
| $C_4F_{10}$ | 0–15 |
| $C_3F_8$ | 10–40 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 2

| COMPONENT | CONCENTRATION RANGE |
| --- | --- |
| $C_3H_3F_5$ | 5–25 |
| $C_4F_{10}$ | 0–15 |
| $C_3F_8$ | 10–40 |
| $CHF_3$ | 0–30 |
| $CF_4$ | 10–50 |
| Ar | 0–40 |
| $N_2$ | 10–80 |
| Ne | 0–10 |
| He | 0–10 |

TABLE 3

| COMPONENT | CONCENTRATION RANGE |
| --- | --- |
| $C_3H_3F_5$ | 5–25 |
| $C_3H_2F_6$ | 0–15 |
| $C_2H_2F_4$ | 5–20 |
| $C_2HF_5$ | 5–20 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 4

| COMPONENT | CONCENTRATION RANGE |
| --- | --- |
| $CHF_2-O-C_2HF_4$ | 5–25 |
| $C_4F_{10}$ | 0–15 |

TABLE 4-continued

| COMPONENT | CONCENTRATION RANGE |
|---|---|
| $CF_3$—O—$CHF_2$ | 10–40 |
| $CF_3$—O—$CF_3$ | 0–20 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 5

| COMPONENT | CONCENTRATION RANGE |
|---|---|
| $C_3H_3F_5$ | 5–25 |
| $C_3H_2F_6$ | 0–15 |
| $CF_3$—O—$CHF_3$ | 10–40 |
| $CHF_3$ | 0–30 |
| $CF_4$ | 0–25 |
| Ar | 0–40 |
| $N_2$ | 10–80 |
| Ne | 0–10 |
| He | 0–10 |

Table 6 lists a particularly preferred multicomponent refrigerant fluid for use with the invention for supplying refrigeration to a relatively low level such as for the liquefaction of nitrogen.

TABLE 6

| COMPONENT | MOL FRACTION |
|---|---|
| Perfluoropentane | 0.11 |
| Perfluoropropane | 0.10 |
| Fluoroform | 0.09 |
| Tetrafluoromethane | 0.13 |
| Argon | 0.22 |
| Nitrogen | 0.29 |
| Neon | 0.96 |

Table 7 lists another particularly preferred multicomponent refrigerant fluid for use with the invention for supplying refrigeration to a relatively low level such as for the liquefaction of nitrogen.

TABLE 7

| COMPONENT | MOL FRACTION |
|---|---|
| Perfluoropentane | 0.15 |
| Perfluoropropane | 0.15 |
| Fluoroform | 0.10 |
| Tetrafluoromethane | 0.24 |
| Argon | 0.15 |
| Nitrogen | 0.21 |

The invention is especially useful for providing refrigeration over a wide temperature range, particularly one which encompasses cryogenic temperatures. In a preferred embodiment of the invention each of the two or more components of the refrigerant mixture has a normal boiling point which differs by at least 5 degrees Kelvin, more preferably by at least 10 degrees Kelvin, and most preferably by at least 20 degrees Kelvin, from the normal boiling point of every other component in that refrigerant mixture. This enhances the effectiveness of providing refrigeration over a wide temperature range, particularly one which encompasses cryogenic temperatures. In a particularly preferred embodiment of the invention, the normal boiling point of the highest boiling component of the multicomponent refrigerant fluid is at least 50° K., preferably at least 100° K., most preferably at least 200° K., greater than the normal boiling point of the lowest boiling component of the multicomponent refrigerant fluid.

The components and their concentrations which make up the multicomponent refrigerant fluid useful in the practice of this invention are such as to form a variable load multicomponent refrigerant fluid and preferably maintain such a variable load characteristic throughout the whole temperature range of the method of the invention. This markedly enhances the efficiency with which the refrigeration can be generated and utilized over such a wide temperature range. The defined preferred group of components has an added benefit in that they can be used to form fluid mixtures which are non-toxic, non-flammable and low or non-ozone-depleting. This provides additional advantages over conventional refrigerants which typically are toxic, flammable and/or ozone-depleting.

One preferred variable load multicomponent refrigerant fluid useful in the practice of this invention which is non-toxic, non-flammable and non-ozone-depleting comprises two or more components from the group consisting of $C_5F_{12}$, $CHF_2$—O—$C_2HF_4$, $C_4HF_9$, $C_3H_3F_5$, $C_2F_5$—O—$CH_2F$, $C_3H_2F_6$, $CHF_2$—O—$CHF_2$, $C_4F_{10}$, $CF_3$—O—$C_2H_2F_3$, $C_3HF_7$, $CH_2F$—O—$CF_3$, $C_2H_2F_4$, $CHF_2$—O—$CF_3$, $C_3F_8$, $C_2HF_5$, $CF_3$—O—$CF_3$, $C_2F_6$, $CHF_3$, $CF_4$, $O_2$, Ar, $N_2$, Ne and He.

Now with the use of this invention one can more efficiently liquefy industrial gas using a single circuit liquefaction cycle by more effectively providing refrigeration from ambient temperature to the cryogenic temperature levels required for the liquefaction. Although the invention has been described in detail with reference to certain preferred embodiments, those skilled in the art will recognize that there are other embodiments of the invention within the spirit and the scope of the claims. For example, the liquefaction circuit may comprise more than one heat exchanger with phase separation of the industrial gas and recycle of the industrial gas vapor, similar to that illustrated in FIG. 2, after each heat exchanger.

What is claimed is:

1. A method for liquefying an industrial gas comprising:
   (A) compressing a multicomponent refrigerant fluid comprising at least one component from the group consisting of fluorocarbons, hydrofluorocarbons and fluoroethers and at least one component from the group consisting of fluorocarbons, hydrofluorocarbons, fluoroethers and atmospheric gases;
   (B) cooling the compressed multicomponent refrigerant fluid to at least partially condense the multicomponent refrigerant fluid;
   (C) expanding the cooled compressed multicomponent refrigerant fluid to generate refrigeration;
   (D) warming the expanded multicomponent refrigerant fluid by indirect heat exchange with the compressed multicomponent refrigerant fluid to effect said cooling of the compressed multicomponent refrigerant fluid; and
   (E) bringing the expanded multicomponent refrigerant fluid into heat exchange relation with industrial gas and warming the expanded multicomponent refrigerant fluid by indirect heat exchange with said industrial gas to liquefy the industrial gas.

2. The method of claim 1 further comprising compressing the industrial gas through a compressor prior to the heat exchange of the industrial gas with the expanded multicomponent refrigerant fluid.

3. The method of claim 2 further comprising reducing the pressure of the liquefied industrial gas to flash a portion of the liquefied industrial gas to an industrial gas vapor, and passing said industrial gas vapor to the compressor.

4. The method of claim 3 further comprising warming the industrial gas vapor by indirect heat exchange with the liquefying compressed industrial gas prior to passing the industrial gas vapor to the compressor.

5. The method of claim 1 wherein the multicomponent refrigerant fluid comprises at least two components from the group consisting of fluorocarbons, hydrofluorocarbons and fluoroethers and at least one atmospheric gas.

6. The method of claim 1 wherein the multicomponent refrigerant fluid comprises at least two components from the group consisting of fluorocarbons, hydrofluorocarbons and fluoroethers and at least two atmospheric gases.

7. The method of claim 1 wherein the multicomponent refrigerant fluid comprises at least one fluoroether and at least one component from the group consisting of fluorocarbons, hydrofluorocarbons, fluoroethers and atmospheric gases.

8. The method of claim 1 wherein each of the components of the multicomponent refrigerant fluid has a normal boiling point which differs by at least 5 degrees Kelvin from the normal boiling point of each of the other components of the multicomponent refrigerant fluid.

9. The method of claim 1 wherein the normal boiling point of the highest boiling component of the multicomponent refrigerant fluid is at least 50° K. greater than the normal boiling point of the lowest boiling component of the multicomponent refrigerant fluid.

10. The method of claim 1 wherein the multicomponent refrigerant fluid comprises at least two components from the group consisting of $C_5F_{12}$, $CHF_2O—C_2HF_4$, $C_4HF_9$, $C_3H_3F_5$, $C_2F_5—O—CH_2F$, $C_3H_2F_6$, $CHF_2—O—CHF_2$, $C_4F_{10}$, $CF_3—O—C_2H_2F_3$, $C_3HF_7$, $CH_2F—O—CF_3$, $C_2H_2F_4$, $CHF_2—O—CF_3$, $C_3F_8$, $C_2HF_5$, $CF_3—O—CF_3$, $C_2F_6$, $CHF_3$, $CF_4$, $O_2$, Ar, $N_2$, Ne and He.

11. The method of claim 1 wherein the multicomponent refrigerant fluid is a variable load multicomponent refrigerant fluid throughout the whole temperature range of the method.

* * * * *

UNITED STATES PATENT AND TRADEMARK OFFICE
CERTIFICATE OF CORRECTION

PATENT NO. : 6,041,621
DATED : March 28, 2000
INVENTOR(S) : Olszewski et al.

It is certified that error appears in the above-indentified patent and that said Letters Patent is hereby corrected as shown below:

In column 7, TABLE 6, change the mole fraction of Neon to read --0.06--.

Signed and Sealed this

Sixth Day of February, 2001

Attest:

Attesting Officer

Q. TODD DICKINSON
Director of Patents and Trademarks